United States Patent
Macha et al.

(10) Patent No.: US 12,086,255 B2
(45) Date of Patent: *Sep. 10, 2024

(54) EDGE DAY ZERO SECURE INFRASTRUCTURE IDENTIFICATION AND ATTESTATION

(71) Applicant: Dell Products L.P., Round Rock, TX (US)

(72) Inventors: Eloy Francisco Macha, Las Cruces, NM (US); William Jeffery White, Plano, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 389 days.

This patent is subject to a terminal disclaimer.

(21) Appl. No.: 17/454,158

(22) Filed: Nov. 9, 2021

(65) Prior Publication Data
US 2023/0147827 A1    May 11, 2023

(51) Int. Cl.
G06F 21/57    (2013.01)
H04L 9/32     (2006.01)
H04L 9/40     (2022.01)

(52) U.S. Cl.
CPC ............ *G06F 21/57* (2013.01); *H04L 9/3239* (2013.01); *H04L 9/3268* (2013.01); *H04L 63/0236* (2013.01); *G06F 2221/034* (2013.01)

(58) Field of Classification Search
None
See application file for complete search history.

(56) References Cited

U.S. PATENT DOCUMENTS

| | | |
|---|---|---|
| 8,935,781 B1 | 1/2015 | Muth |
| 10,270,770 B1 | 4/2019 | Irwan et al. |
| 10,346,614 B1 * | 7/2019 | Ko .................. H04L 9/3247 |
| 11,288,377 B1 * | 3/2022 | Kopylov ............. G06F 9/45558 |
| 11,539,582 B1 | 12/2022 | Gupta et al. |
| 2003/0147402 A1 | 8/2003 | Brahim |
| 2004/0114610 A1 | 6/2004 | Featherston et al. |
| 2006/0090084 A1 | 4/2006 | Buer |

(Continued)

OTHER PUBLICATIONS https://tpm2-software.github.io/tpm2-tss/getting-started/2019/12/18/Remote-Attestation.html.

*Primary Examiner* — Atta Khan
(74) *Attorney, Agent, or Firm* — Workman Nydegger

(57) ABSTRACT

Self-provisioning a computer system is illustrated. Code in a secure base activation image implements an auto-connection service at the computer system. The auto-connection service attempts to perform a local activation by attempting to determine that a private port is open and using the private port, initiating an identification and attestation process with an activation service. The auto-connection service performs a remote activation by determining that the private port is closed, defaulting activation to a public port, and using the public port, initiating an identification and attestation process with the activation service. Code in the base activation image implements service(s) which execute an identification process, using a cryptographically created identifier included in the base activation image, with the activation service to confirm an identity of the computer system, confirming system integrity of the computer system with the activation service, unlocking the computer system for load installation.

20 Claims, 12 Drawing Sheets

(56) References Cited

U.S. PATENT DOCUMENTS

| | | |
|---|---|---|
| 2011/0258452 A1 | 10/2011 | Coulier et al. |
| 2015/0181364 A1 | 6/2015 | Chen et al. |
| 2017/0093896 A1* | 3/2017 | Poornachandran ..... G06F 21/82 |
| 2017/0237560 A1* | 8/2017 | Mueller ................ H04L 9/3263 |
| | | 713/168 |
| 2018/0082054 A1 | 3/2018 | Khwaja et al. |
| 2018/0189493 A1 | 7/2018 | Schilder et al. |
| 2018/0287780 A1* | 10/2018 | Safford .................. H04L 63/06 |
| 2019/0053050 A1 | 2/2019 | Jin et al. |
| 2019/0114432 A1 | 4/2019 | Tang et al. |
| 2019/0296911 A1 | 9/2019 | Maki et al. |
| 2019/0363905 A1 | 11/2019 | Yarvis et al. |
| 2020/0169455 A1 | 5/2020 | Nakagawa |
| 2020/0186365 A1 | 6/2020 | Kumar et al. |
| 2020/0250009 A1 | 8/2020 | Jaeger et al. |
| 2020/0275273 A1 | 8/2020 | Smith et al. |
| 2020/0351261 A1 | 11/2020 | Milton et al. |
| 2020/0374700 A1 | 11/2020 | Smith et al. |
| 2020/0396254 A1 | 12/2020 | Crabtree et al. |
| 2021/0014681 A1 | 1/2021 | Pang et al. |
| 2021/0051028 A1 | 2/2021 | Kapon et al. |
| 2021/0091952 A1 | 3/2021 | Wentz |
| 2021/0390186 A1 | 12/2021 | Smith et al. |
| 2022/0131700 A1 | 4/2022 | Shiner et al. |
| 2022/0171648 A1 | 6/2022 | Rodriguez et al. |
| 2022/0198017 A1 | 6/2022 | Fu et al. |
| 2022/0255916 A1 | 8/2022 | Smith et al. |
| 2022/0321362 A1 | 10/2022 | Konda et al. |
| 2023/0351056 A1* | 11/2023 | Marando ................ G06F 21/64 |

* cited by examiner

EDGE DAY ZERO SECURE INFRASTRUCTURE IDENTIFICATION AND ATTESTATION

FIELD OF THE INVENTION

Embodiments of the present invention generally relate to provisioning a computer system. More particularly, at least some embodiments of the invention relate to systems, hardware, software, computer-readable media, and methods for automatically provisioning a computer system in an edge distributed environment using a pre-installed base activation image to implement an auto-connection service at the computer system.

BACKGROUND

Edge distributed systems are conceived, designed and deployed for the purpose of workload placement near data sources to enable low latency operation and minimize transport to cloud-based services. This enables autonomous systems, near real-time insights, process control and other perception+decisioning ecosystems. Much like cloud services, telecommunication networks and other technology-based platforms, edge infrastructure equipment is activated and made known to the assignment and management system for the platform. Edge presents a particularly challenging activation and on-boarding process as edge infrastructure will be deployed outside of centralized data centers and with minimal support. Edge activation is complicated due to different edge systems being very heterogeneous with respect to each other. For example, different edge systems can use different hardware components, have different security requirements, and even implement different instruction set architectures (ISAs). Further, due to the edge systems typically being installed outside of the control of a centralized authority, there can be potential for security breaches by nefarious individuals having direct access to the edge system installing deleterious hardware and/or software to the systems in an attempt to compromise security. While this can be overcome by only allowing authorized entities to deliver and set up equipment, this is cost prohibitive and not available in many circumstances.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to provisioning a computer system.

In general, example embodiments of the invention automatically provision a computer system using a pre-installed base activation image to implement an auto-connection service at the computer system which is able to connect to an activation service to provision the computer system.

Embodiments illustrated herein include functionality to activate infrastructure to a known secure and operational state and then install a set of applications that enable the infrastructure to participate in an edge platform framework in a secure manner which is appropriately verified.

Embodiments implement a highly automated process that can be implemented with little or no human intervention. Activation is defined as placing a target system image on the target infrastructure system in a secure and attestable manner with networking and system configurations that place the system in an operational state. Activation can be divided into three distinct subdivisions, including: day zero (initial system installation and boot), day 1 (application and platform onboarding), and lifecycle (runtime management of end user application execution and infrastructure operations). The majority of the following discussion focusses on day zero activation and onboarding.

Onboarding is defined as placing a set of software capabilities that allow the system to participate within an edge distributed secure platform.

The following now illustrates additional details.

Figure 1:
FIG. 1 discloses aspects of a computer system having a base activation image.

Referring now to FIG. 1, a base activation image 104 is stored to a computer system 102. For example, the base activation image 104 may be stored to persistent storage, such as a hard drive or other persistent medium. The base activation image 104 is defined with minimal capabilities as will be discussed in more detail below. Defining the base activation image 104 with minimal capabilities eliminates various vectors of attack that might otherwise be used to attack the computer system 102.

Some embodiments utilize a secure Linux distribution that has multi ISA support and a very small and verifiable resource requirement for the base activation image 104. For example, the distribution for the base activation image may be implemented to have no multi-user logins. Further, the distribution may be based on API-controls. The base activation image 104 includes instructions to implement one or more services that perform the following:

Enhanced network discovery.
Auto-connection capability.
Security configuration.

A secure vault for cryptographic secrets.

Remote attestation capability.

A default hardware port controller.

The base activation image 104 is loaded on the computer system 102 in a secure fashion. For example, this may be accomplished using a facility that is under the control of the customer of the edge platform or the edge platform provider that performs custom integration (adding hardware/software functionality to manufactured systems). These facilities are commonly called merge or integration facilities. Alternatively, the base activation image 104 may be imaged to the computer system in a security-controlled facility having safeguards to ensure that unauthorized tampering does not occur to the computer system 102 or the base activation image 104.

During the imaging process several other actions can be performed. For example, in some embodiments, device specific edge platform cryptographic signed certifications are installed in the base activation image 104. Alternatively, or additionally, SHA256 is used to create a unique registration key using one or more of an edge platform key, a device key, a device serial number and/or an edge platform edge host name. Alternatively or additionally, a host name is placed into an edge platform inventory base with a system configuration enumeration (resource configuration and equipage). At this point, the computer system 102 is marked as locked and inactive.

Figure 2:
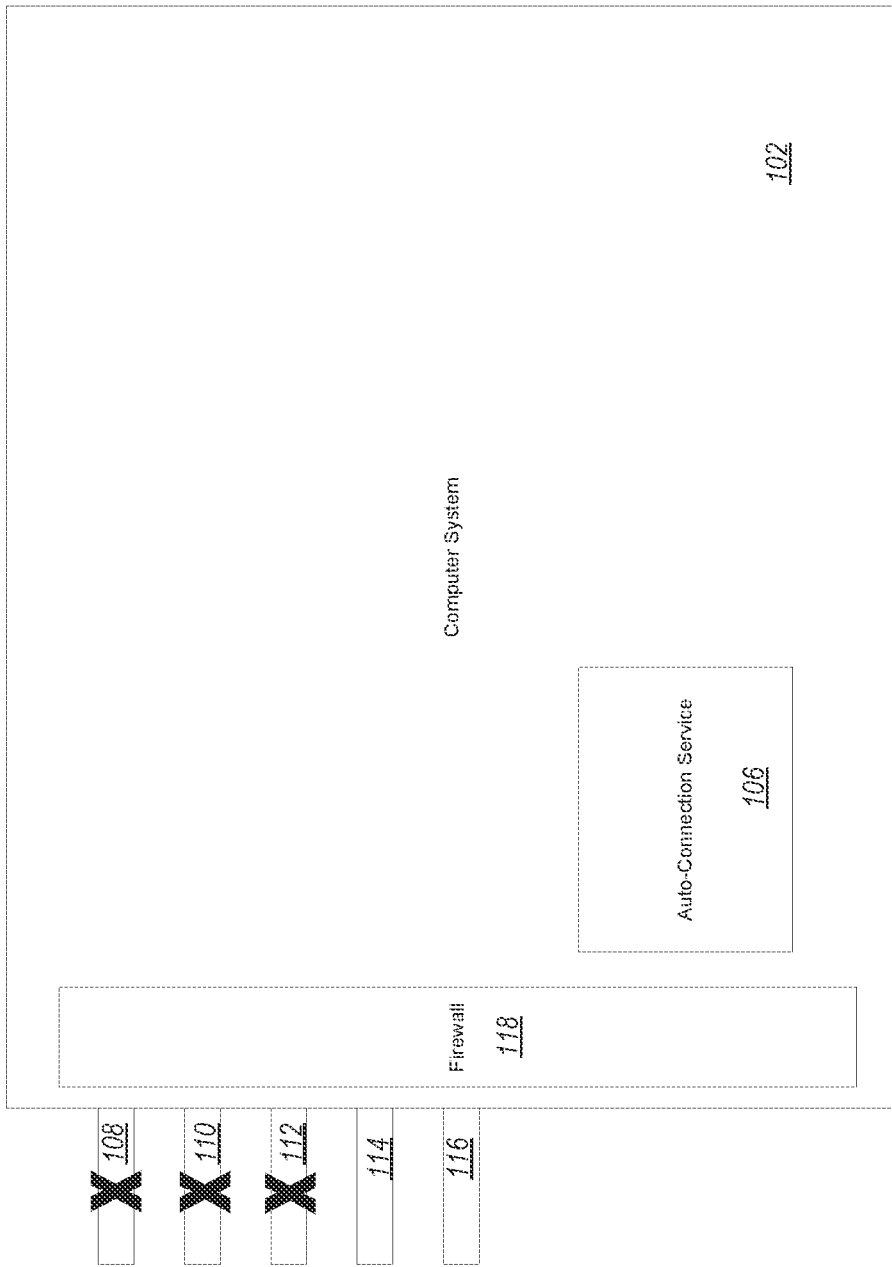
FIG. 2 discloses aspects of the computer system implementing an auto-connection service, a firewall, and configuring ports.

The system is then shipped and installed at an edge location. Referring now to FIG. 2, at boot time various actions are taken by executing code in the base activation image 104. In some embodiments, ports not needed for contacting an activation service (see FIG. 3 and further discussion below), such as USB ports, 2 additional ethernet ports, etc., are deactivated to prevent side channel memory attacks. This deactivation can be performed at the Unified Extensible Firmware Interface (UEFI) for the protection ring-2 level. For example, FIG. 2 illustrates that ports 108, 110, and 112 are deactivated while ports 114 and 116 remain activated in the computer system 102. In this example, as will be illustrated in more detail below, port 114 is a private port, while port 116 is a public port.

Executing code in the base activation image 104 can be used to activate a base secure on-board firewall 118. This can be used to prevent attacks on the non-deactivated ports 114 and 116.

Executing code in the base activation image 104 can be used to launch the computer system 102 and obtain a local IP address through DHCP.

Executing code in the base activation image 104 can be used to start the auto-connection service 106.

Figure 3:
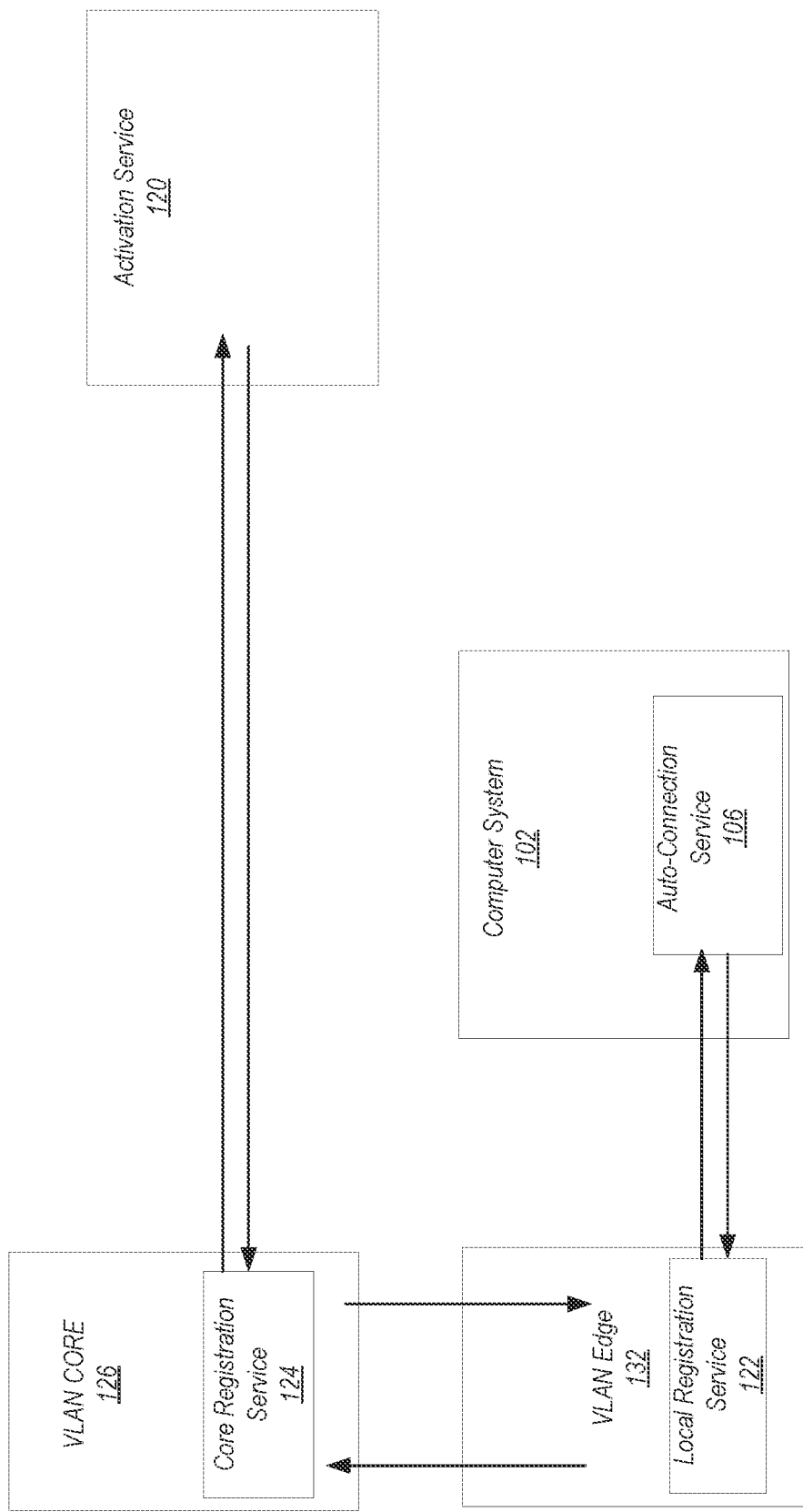
FIG. 3 discloses aspects of the computer system connecting to an activation service through a private port.

The auto-connection service 106 performs various functions. For example, the auto-connection service 106 initially utilizes a private port 114 that is preconfigured to be open to implement a private activation service. The private activation service is a capability that allows activation of the infrastructure when the infrastructure is deployed to a network that does not have access to the public Internet. A TCP/IP port is designated and privately networked through a secure connection to the onboarding capability. This is suitable for edge locations without direct internet access as illustrated in FIG. 3. The private auto-connection capability determines if the port is open and, if it is, initiates the identification and attestation process through a secure connection, such as a Transport Layer Security (TLS) connection to the platform activation service 120 (see FIG. 3). In particular, a given edge platform having edge computing systems has an activation service 120 that is reachable via a secure connection, such as a TLS connection. The activation service 120 can perform challenge authentication. In some embodiments, the activation service 120 can perform a challenge authentication based on an SHA256 hash included in the base activation image 104. The activation service 120 can implement a remote attestation protocol to perform the challenge authentication. The activation service 120 can implement a policy rules engine to manage system exceptions with prescribed actions based on system state.

Thus, in the particular example illustrated in FIG. 3, activation is performed by the computer system 102 contacting a local registration service 122 using a private TCP/IP port 114 (see FIG. 2) (that is configurable to end customer specifications) to connect with the local registration service 122 in the VLAN edge 132, which connects with a core registration service 124 of a VLAN core 126 that is able to connect to the activation service 120 located remote from the computer system 102 in a cloud or other service. In this example, there are various levels of systems including cloud systems, core systems and edge systems. Cloud systems are centralized, remote systems, whereas core systems are more proximate end users but still represent a system that is a step removed from the end users where certain resources will be pooled, whereas edge systems are proximate and usable by the end users.

Figure 4:
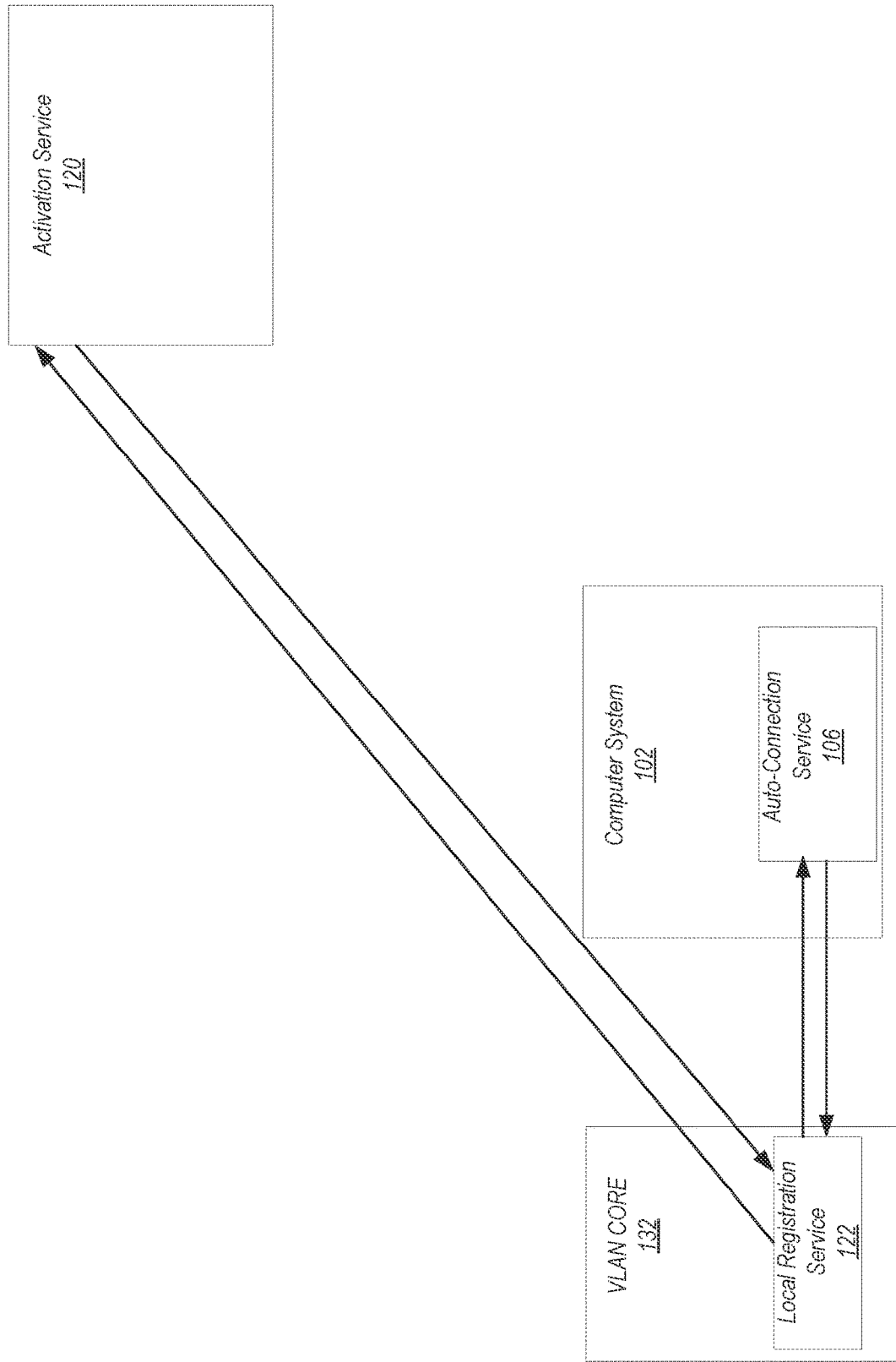
FIG. 4 discloses aspects of the computer system connecting to an activation service through a public port.

If the private port 114 is closed, as illustrated in FIG. 4, the auto-connection service 106 defaults to a public port 116 (see FIG. 2) for a connection to contact the activation service 120. In some embodiments, port 443 is used. Port 443 is a port used for secured HTTP traffic.

Once a secure connection, such as a TLS connection, is established, an identification process is executed to confirm an identity of the computer system 102 based on the secure hash process executed at system build to create a cryptographically created identifier (e.g., a SHA256 hash as described above) at manufacture to identify the computer system 102.

A remote secure attestation process is executed as described above, and identity is verified using the cryptographically created identifier. Further, system integrity is confirmed to the platform activation service 120. This can be performed using a cryptographically created identifier that is based on the configuration of the computer system 102.

Upon completion of confirmation of identity and integrity of the computer system 102 using autoconnection and the platform activation service 120, the computer system 102 is unlocked and opened for the platform load.

The following now illustrates additional details with respect to the computer system 102 load installation. In this example, the computer system load is the operating load. Once the computer system 102 has been authenticated, identified and integrity attested, the computer system 102 is considered unlocked but inactive. The activation service 120 initiates any number of tools such as MaaS available from Canonical Ltd., RackN available from RackN, Inc., Intel Secure Device Onboarding (SDO), etc., to identify capabilities for the computer system 102 in a detailed inventory. For example, tools may be used to identify CPU capabilities, memory capabilities, storage capabilities, GPU capabilities, etc.

The activation service 120 also obtains a prepopulated inventory from an equipment database included in, or created by, the base activation image 104.

The activation service 120 uses the detailed inventory of the computer system 102 and compares it to the prepopulated inventory to confirm that the computer system 102 is properly configured, so as to ensure that expected elements are included in the computer system 102. This can be used to ensure needed components are included, as well as to ensure that no additional, potentially nefarious, components have been added to the computer system 102. If the detailed inventory matches the prepopulated inventory, activation continues. If the detailed inventory does not match the prepopulated inventory, then a preconfigured policy is consulted to either continue based on discovered configuration or stop for human investigation.

The activation service 120 causes firmware (e.g., UEFI/BIOS) level patching to be executed and security to be confirmed. Power control of the computer system 102 is established so that the computer system 102 can remotely reboot. A disk at the computer system 102 is partitioned into two boot sectors (A/B) which provides additional availability protection and security. The activation service 120 then initiates the installation of the computer system 102 load, for example using a preboot execution environment (PXE) boot process.

Figure 5:
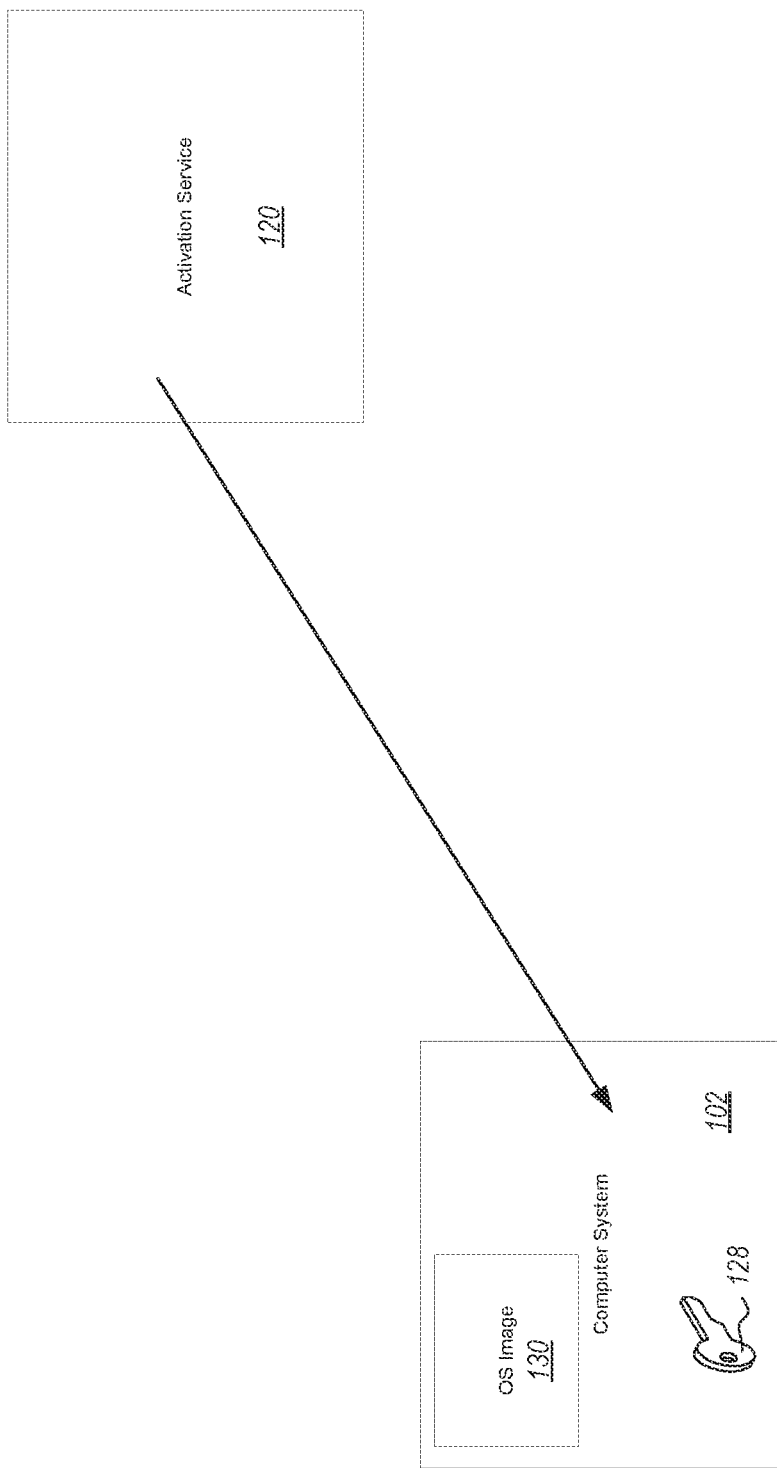
FIG. 5 discloses aspects of load installation for the computer system.

In some embodiments, installation of the load comprises removing the base activation image 104, and then as illustrated in FIG. 5, establishing new device trust by deploying a computer system TPM key 128 and deploying a secured OS image 130 with signed certifications from the computer system 102.

The following now illustrates additional details with respect to computer system platform commissioning and configuration. Once the computer system 102 platform has base secure load activated, a secure attestation process is run to confirm system integrity and to ensure that the computer system 102 is fully attested and secure. System patching is completed to the base platform load to ensure that appropriate updates are installed at the computer system 102. Base platform load partitions are encrypted for security purposes. TPM PCR registers are reset and the computer system 102 is rebooted remotely again. A secure enclave is established to secure a virtual machine (VM) or container. Secure Zero Trust Network/SASE capability is installed and configured. This is onboarded with a network secure attestation process. Some embodiments use a secure VPN network tied directly to the secure enclave VM/Container. After installation of the enclave a secure attestation routine is established and configured for the secure enclave. Hypervisor specific configuration is completed at this stage.

The following now illustrates additional details with respect to platform functionality installation. In some embodiments, platform specific functionality is installed as application packages. Privilege sensitive functionality is installed first in the secure enclave container/VM. The remaining functionality is then installed for the computer system 102.

The following now illustrates additional details with respect to platform release to service. The activation service 120 conducts a system audit and executes functionality tests confirming computer system 102 operation. The activation service 120 executes a final secure attestation process for the computer system 192 and secure enclave. The activation service 120 makes any final changes to inventory. The activation service 120 starts infrastructure (i.e., computer system level) telemetry.

The activation service marks the platform as active and available for assignment/scheduling.

Figure 7:
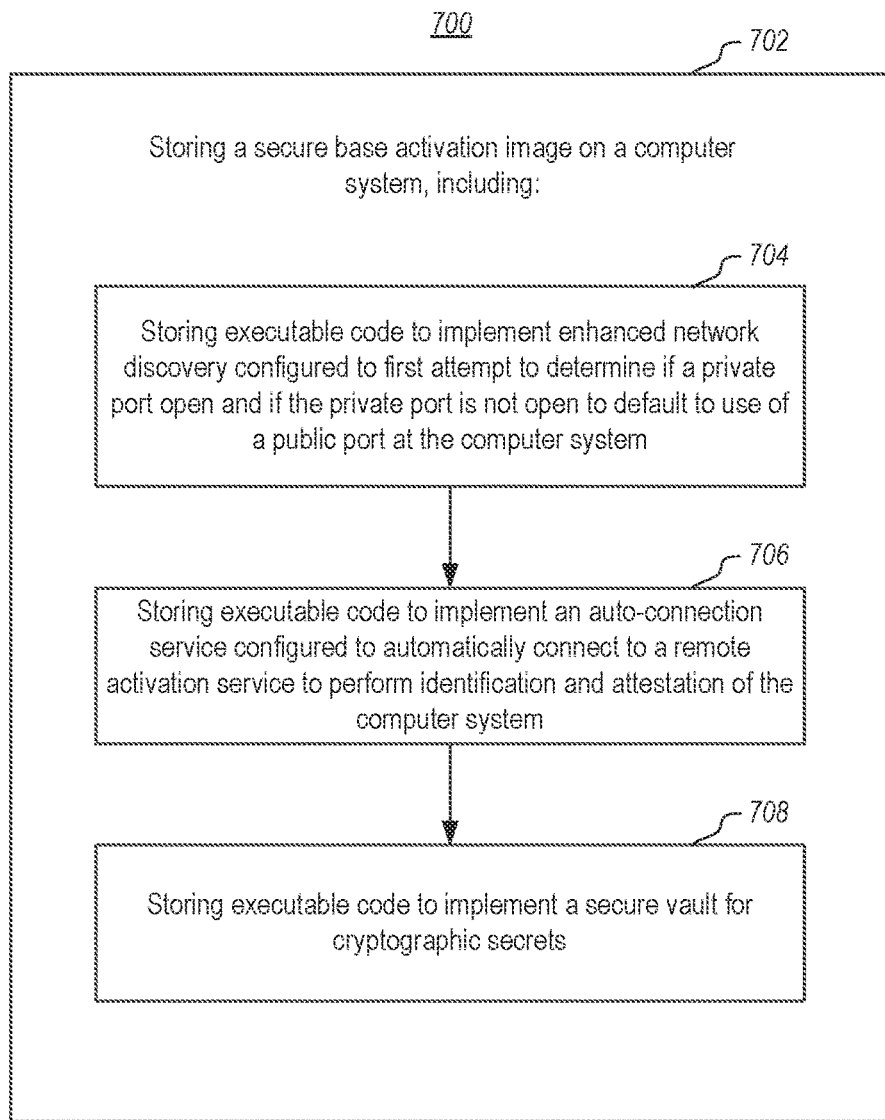
FIG. 7 illustrates a method of implementing a self-provisioning computer system.

Referring now to FIG. 7, a method 700 of provisioning a self-provisioning computer system is illustrated. The method 700 includes executing code in a secure base activation image to implement an auto-connection service at the computer system (act 702).

The method 700 further includes the auto-connection service attempting to perform a local activation by attempting to perform the following: determining that a private port is open; and using the private port, initiating an identification and attestation process with an activation service (act 704).

The method 700 further includes the auto-connection service performing a remote activation by performing the following: determining that the private port is closed; as a result of determining that the private port is closed, defaulting activation to a public port; and using the public port, the auto-connection service initiating an identification and attestation process with the activation service (act 706).

The method 700 further includes executing code in a secure base activation image to implement one or more services which perform the following: executing an identification process, using a cryptographically created identifier included in the base activation image, with the activation service to confirm an identity of the computer system; confirming system integrity of the computer system with the activation service; and based on confirming the identity of the computer system and confirming system integrity of the computer system, unlocking the computer system for load installation (act 708).

Figure 8:
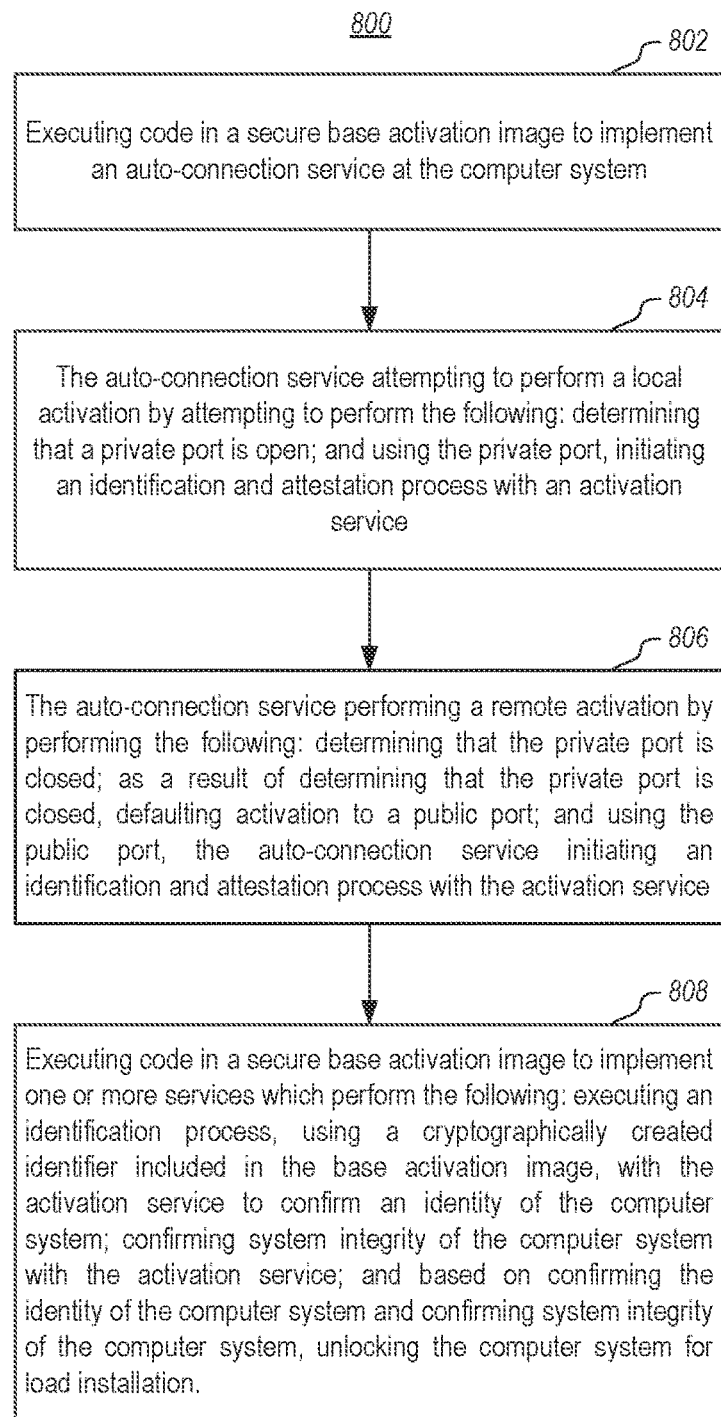
FIG. 8 illustrates a method of method of provisioning a self-provisioning computer system.

Referring now to FIG. 8, a method 800 of implementing a self-provisioning computer system is illustrated. The method 800 includes storing a secure base activation image on a computer system (802), including: storing executable code to implement enhanced network discovery configured to first attempt to determine if a private port open and if the private port is not open to default to use of a public port at the computer system (act 804). Act 802 further includes storing executable code to implement an auto-connection service configured to automatically connect to a remote activation service to perform identification and attestation of the computer system (act 806). Act 804 further includes storing executable code to implement a secure vault for cryptographic secrets (act 806).

Figure 9:
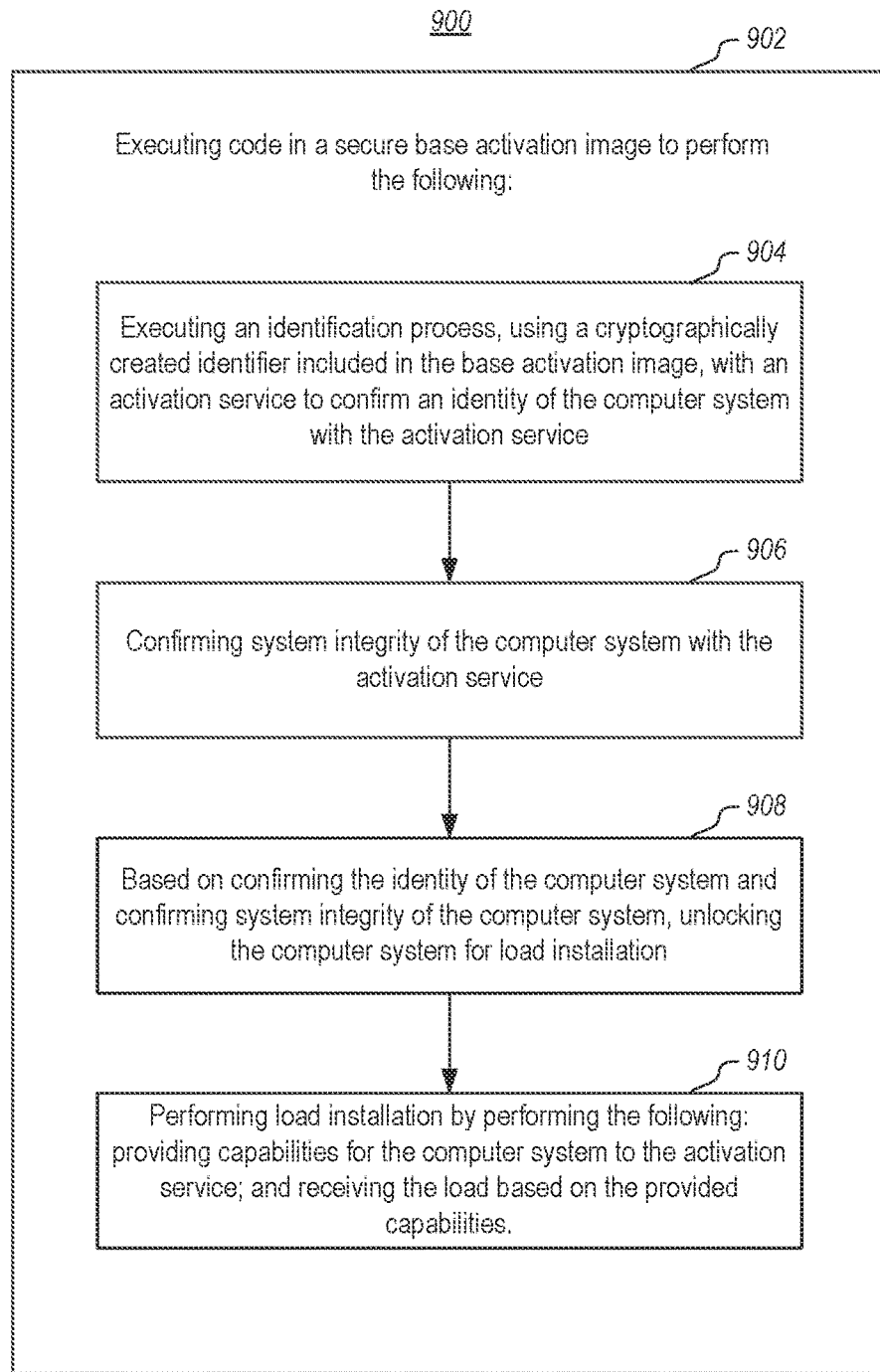
FIG. 9 illustrates a method of method of provisioning a self-provisioning computer system.

Referring now to FIG. 9, a method 900 of provisioning a self-provisioning computer system is illustrated. The method 900 includes executing code in a secure base activation image (act 902) to perform the following: executing an identification process, using a cryptographically created identifier included in the base activation image, with an activation service to confirm an identity of the computer system with the activation service (act 904). Act 902 further includes confirming system integrity of the computer system with the activation service (act 906). Act 902 further includes based on confirming the identity of the computer system and confirming system integrity of the computer system, unlocking the computer system for load installation (act 908).

The method 900 further includes performing load installation by performing the following: providing capabilities for the computer system to the activation service; and receiving the load based on the provided capabilities (act 910).

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computer system elements, such as computer system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

Following are some further example embodiments of the invention. These are presented only by way of example and are not intended to limit the scope of the invention in any way.

Embodiment 1.1. A method of implementing a self-provisioning computer system, the method comprising: storing a secure base activation image on a computer system, including: storing executable code to implement enhanced network discovery configured to first attempt to determine if a private TCP port is open and if the private TCP port is not open to default to use of a public URL on a well-known TCP port at the computer system; storing executable code to implement an auto-connection service configured to automatically connect to a remote activation service to perform identification and attestation of the computer system; and storing executable code to implement a secure vault for cryptographic secrets.

Embodiment 1.2. The method of embodiment 1.1, wherein storing a secure base activation image on the computer system is performed in a manufacturer controlled facility.

Embodiment 1.3. The methods of embodiments 1.1, and/or 1.2, wherein storing a secure base activation image on the computer system is performed at a customer controlled merge or integration facility.

Embodiment 1.4. The methods of embodiments 1.1, 1.2, and/or 1.3, wherein storing a secure base activation image on the computer system is performed to store a secure base activation image having support for a plurality of instruction set architectures. For example, such architectures may include two or more of x86, ARM-64, RISC-V, etc.

Embodiment 1.5. The methods of embodiments 1.1, 1.2, 1.3, and/or 1.4, further comprising storing one or more cryptographically signed certificates that are specific to the computer system.

Embodiment 1.6. The methods of embodiments 1.1, 1.2, 1.3, 1.4, and/or further comprising storing a cryptographically created identifier that comprises a unique registration key created using SHA256 and at least one of a platform key, a device key, a device serial number, or a platform host name.

Embodiment 1.7. The methods of embodiments 1.1, 1.2, 1.3, 1.4, 1.5, and/or 1.6, further comprising storing executable instructions that cause a UEFI to automatically deactivate unused physical I/O ports at start-up. Such physical I/O ports may be, for example, USB ports.

Embodiment 1.8. The methods of embodiments 1.1, 1.2, 1.3, 1.4, 1.5, 1.6, and/or 1.7, further comprising storing executable instructions that cause one or more services to automatically activate a firewall.

Embodiment 1.9. The methods of embodiments 1.1, 1.2, 1.3, 1.4, 1.5, 1.6, 1.7, and/or 1.8, wherein the base activation image is configured to prevent multiple-user logins.

Embodiment 1.10. The methods of embodiments 1.1, 1.2, 1.3, 1.4, 1.5, 1.6, 1.7, 1.8, and/or 1.9, further comprising: storing a host name in an inventory base with a computer system configuration; and marking the computer system as locked and inactive.

Embodiment 2.1. A method, of provisioning a self-provisioning computer system, the method comprising: executing code in a secure base activation image to implement an auto-connection service at the computer system; the auto-connection service attempting to perform a local activation by attempting to perform the following: (a) determining that a private port is open; and (b) using the private port, initiating an identification and attestation process with an activation service; and the auto-connection service performing a remote activation by performing the following: (a) determining that the private port is closed; (b) as a result of determining that the private port is closed, defaulting activation to a public port; and (c) using the public port, the auto-connection service initiating an identification and attestation process with the activation service; executing code in a secure base activation image to implement one or more services which perform the following: (a) executing an identification process, using a cryptographically created identifier included in the base activation image, with the activation service to confirm an identity of the computer system; (b) confirming system integrity of the computer system with the activation service; and (c) based on confirming the identity of the computer system and confirming system integrity of the computer system, unlocking the computer system for load installation.

Embodiment 2.2 The method of embodiment 2.1, wherein the base activation image is implemented to have support for a plurality of instruction set architectures. For example, such architectures could include two or more of x86-64, ARM-64, RISC-V, etc.

Embodiment 2.3 The methods of embodiments 2.1 and/or 2.2, wherein the base activation image comprises cryptographically signed certificates that are specific to the computer system.

Embodiment 2.4 The methods of embodiments 2.1, 2.2, and/or 2.3, wherein the cryptographically created identifier comprises a unique registration key created using SHA256 and at least one of a platform key, a device key, a device serial number, or a platform host name.

Embodiment 2.5 The methods of embodiments 2.1, 2.2, 2.3, and/or 2.4, further comprising the one or more services using a UEFI to deactivate unused ports.

Embodiment 2.6 The methods of embodiments 2.1, 2.2, 2.3, 2.4, and/or 2.5, further comprising the one or more services activating a firewall.

Embodiment 2.7 The methods of embodiments 2.1, 2.2, 2.3, 2.4, 2.5, and/or 2.6, further comprising the one or more services causing the load installation by: providing capabilities for the computer system to the activation service; and receiving the load based on the provided capabilities.

Figure 10:
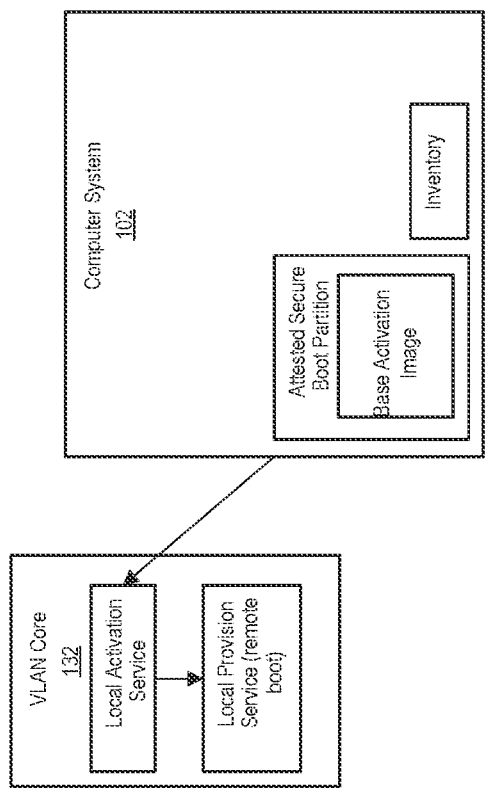
FIG. 10 illustrates a block diagram showing details regarding providing a self-provisioning computer system.

Embodiment 3.1. A method of provisioning a self-provisioning computer system, the method comprising: executing code in a secure base activation image to perform the following: executing an identification process, using a cryptographically created identifier included in the base activation image, with an activation service to confirm an identity of the computer system with the activation service; confirming system integrity of the computer system with the activation service; based on confirming the identity of the computer system and confirming system integrity of the computer system, unlocking the computer system for load installation; performing load installation by performing the following: providing capabilities for the computer system to the activation service; and receiving the load based on the provided capabilities. See FIG. 10 for a block diagram illustrating this functionality.

Embodiment 3.2. The method of embodiment 3.1, wherein receiving the load is performed as a result of the activation service: obtaining a prepopulated inventory included in the secure base activation image; taking a current inventory of the computer system; comparing the prepopulated inventory with the current inventory; and determining that the prepopulated inventory matches the current inventory.

Embodiment 3.3. The methods of embodiments 3.1 and/or 3.2, wherein receiving the load is performed as a result of the activation service: obtaining a prepopulated inventory included in the secure base activation image; taking a current inventory of the computer system; comparing the prepopulated inventory with the current inventory; determining that the prepopulated inventory does not match the current inventory; and consulting a policy that indicates that the load can be provided based on the current inventory.

Embodiment 3.4. The methods of embodiments 3.1, 3.2, and 3.3, wherein receiving the load is performed as a result of the activation service: obtaining a prepopulated inventory included in the secure base activation image; taking a current inventory of the computer system; comparing the prepopulated inventory with the current inventory; determining that the prepopulated inventory does not match the current inventory; and waiting for human interaction regarding the prepopulated inventory not matching the current inventory.

Embodiment 3.5. The methods of embodiments 3.1, 3.2, 3.3, and 3.4 further comprising: performing firmware level patching; and confirming security of the computer system.

Embodiment 3.6. The methods of embodiments 3.1, 3.2, 3.3, 3.4, and 3.5 further comprising establishing power control of the computer system to allow the computer system to be remotely rebooted.

Figure 11:
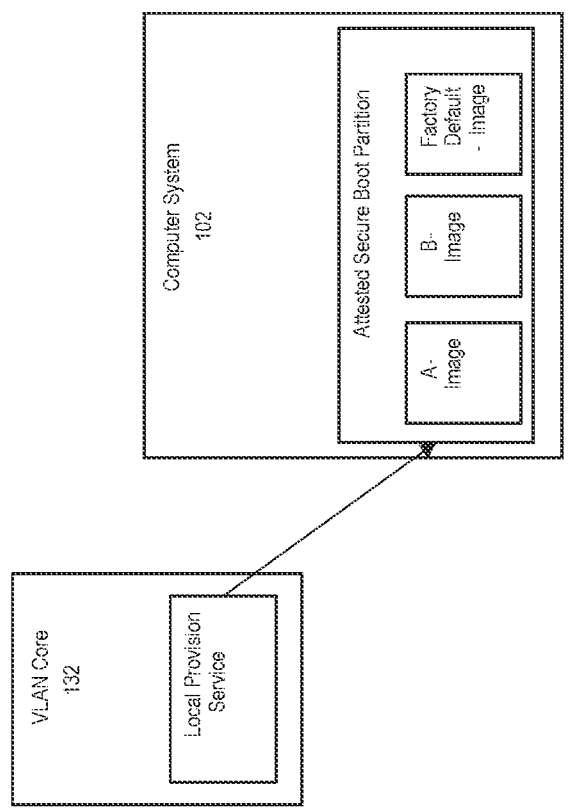
FIG. 11 illustrates a block diagram showing details regarding deploying a secured operating system image.

Embodiment 3.7. The methods of embodiments 3.1, 3.2, 3.3, 3.4, 3.5, and 3.6 further comprising: removing the secure base activation image; establishing new device trust by deploying a computer system TPM key; and deploying a secured operating system image with signed certificates from the computer system by deploying two identical operating system images to allow for multiple boot functionality and a third operating system image implementing a factory default operating system on an attested, secure, monitored boot partition. See FIG. 11 for a block diagram illustrating this functionality.

Figure 12:
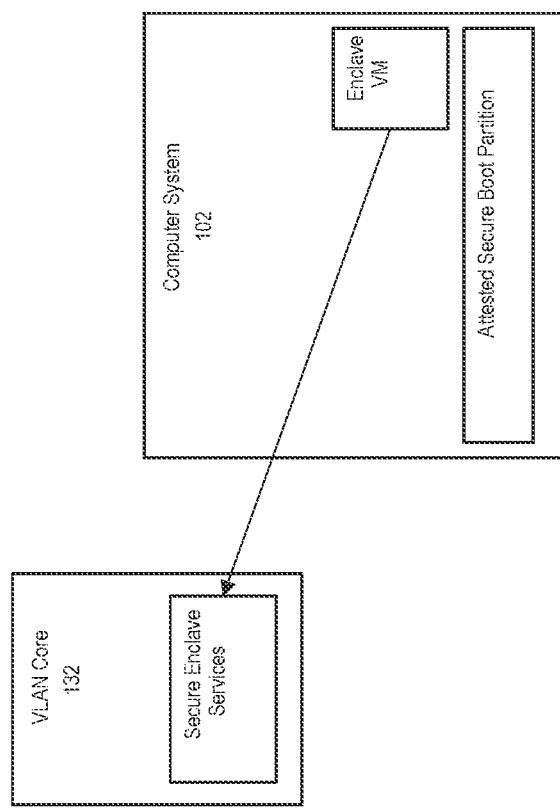
FIG. 12 illustrates tying a VPN network to a secure enclave VM.

Embodiment 3.8. The methods of embodiments 3.1, 3.2, 3.3, 3.4, 3.5, 3.6, and 3.7 further comprising: establishing a secure enclave for a secure VM or container; installing and configuring a secure VPN network that utilizes a secure access service edge approach to have policy based self-learning security tied directly to the secure enclave VM or container; and establishing a secure attestation routine for the secure enclave. See FIG. 12 for a block diagram illustrating this functionality.

Embodiment 3.9. The methods of embodiments 3.1, 3.2, 3.3, 3.4, 3.5, 3.6, 3.7, and 3.8 further comprising installing computer system functionality as application packages including installing application packages for privilege sensitive functionality in a secure enclave VM or container prior to installing any other application packages for other functionality for the system.

Embodiment 3.10. The methods of embodiments 3.1, 3.2, 3.3, 3.4, 3.5, 3.6, 3.7, 3.8, and/or 3.9 further comprising: conducting a system audit including executing functionality tests confirming system operation; executing a final attestation process for the computer system and a secure enclave established at the computer system; starting computer system telemetry; and marking the computer system as active and available for scheduling.

Embodiment 4.0. A method for performing any of the operations, methods, or processes, or any portion of any of these, disclosed herein.

Embodiment 5. A non-transitory storage medium having stored therein instructions that are executable by one or more hardware processors to perform operations comprising the operations of any one or more of embodiments 1.1 through 3.10

Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed. The computer system can support different instruction set architectures and different classes of computer systems from embedded devices to full featured servers.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computer system. The different components, modules, engines, and services described herein may be implemented as objects or processes that execute on the computer system, for example, as separate threads. While the system and methods described herein may be implemented in software, implementations in hardware or a combination of software and hardware are also possible and contemplated. In the present disclosure, a 'computing entity' may be any computer system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
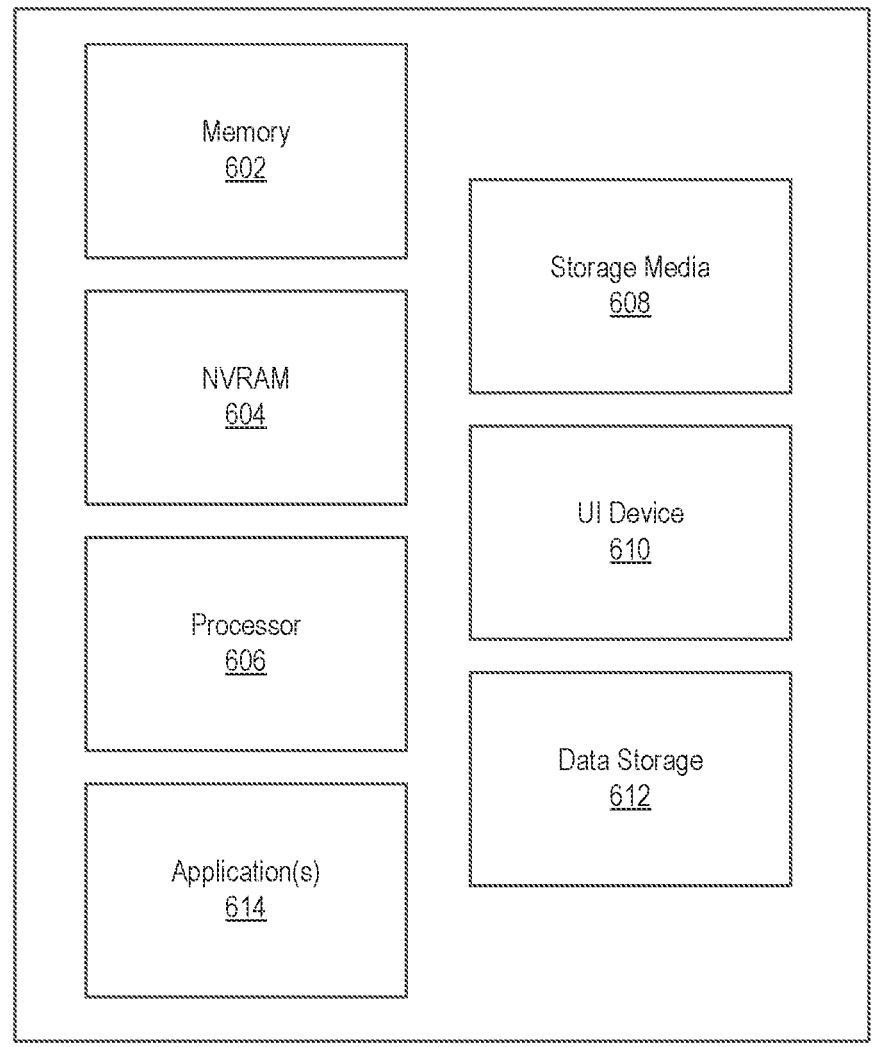
FIG. 6 discloses aspects of a computing system.

With reference briefly now to FIG. 6, any one or more of the entities disclosed, or implied, by the Figures and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random-access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid-state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of provisioning a self-provisioning computer system, the method comprising:
    executing code in a secure base activation image to implement an auto-connection service at the computer system;
    the auto-connection service attempting to perform a local activation by attempting to perform the following upon determining that a private port is open:
       using the private port, initiating an identification and attestation process with an activation service;
    wherein the auto-connection service performs a remote activation by performing the following upon determining that the private port is closed:
       defaulting activation to a public port; and
       using the public port, the auto-connection service initiating an identification and attestation process with the activation service; and
    executing code in the secure base activation image to implement one or more services which perform the following:
       executing an identification process, using a cryptographically created identifier included in the base activation image, with the activation service to confirm an identity of the computer system;
       confirming system integrity of the computer system with the activation service; and
       based on confirming the identity of the computer system and confirming system integrity of the computer system, unlocking the computer system for load installation.

2. The method of claim 1, wherein the base activation image is implemented to have support for a plurality of instruction set architectures.

3. The method of claim 1, wherein the base activation image comprises cryptographically signed certificates that are specific to the computer system.

4. The method of claim 1, wherein the cryptographically created identifier comprises a unique registration key created using SHA256 and at least one of a platform key, a device key, a device serial number, or a platform host name.

5. The method of claim 1, further comprising the one or more services using a UEFI to deactivate unused ports.

6. The method of claim 1, further comprising the one or more services activating a firewall.

7. The method of claim 1, further comprising the one or more services causing the load installation by:
    providing capabilities for the computer system to the activation service; and
    receiving the load based on the provided capabilities.

8. A non-transitory storage medium having stored therein instructions that are executable by one or more hardware processors to perform operations for provisioning a self-provisioning computer system, the operations comprising:
    executing code in a secure base activation image to implement an auto-connection service at the computer system;
    the auto-connection service attempting to perform a local activation by attempting to perform the following upon determining that a private port is open:
       using the private port, initiating an identification and attestation process with an activation service;
    wherein the auto-connection service performs a remote activation by performing the following upon determining that the private port is closed:
       defaulting activation to a public port; and
       using the public port, the auto-connection service initiating an identification and attestation process with the activation service; and
    executing code in the secure base activation image to implement one or more services which perform the following:
       executing an identification process, using a cryptographically created identifier included in the base activation image, with the activation service to confirm an identity of the computer system;
       confirming system integrity of the computer system with the activation service; and
       based on confirming the identity of the computer system and confirming system integrity of the computer system, unlocking the computer system for load installation.

9. The non-transitory storage medium of claim 8, wherein the base activation image is implemented to have support for a plurality of instruction set architectures.

10. The non-transitory storage medium of claim 8, wherein the base activation image comprises cryptographically signed certificates that are specific to the computer system.

11. The non-transitory storage medium of claim 8, wherein the cryptographically created identifier comprises a unique registration key created using SHA256 and at least one of a platform key, a device key, a device serial number, or a platform host name.

12. The non-transitory storage medium of claim 8, further having stored therein instructions that are executable by one or more hardware processors to cause the one or more services using a UEFI to deactivate unused ports.

13. The non-transitory storage medium of claim 8, further having stored therein instructions that are executable by one or more hardware processors to cause the one or more services activating a firewall.

14. The non-transitory storage medium of claim 8, further having stored therein instructions that are executable by one or more hardware processors to cause the one or more services causing the load installation by:
    providing capabilities for the computer system to the activation service; and
    receiving the load based on the provided capabilities.

15. A self-provisioning computer system, the computer system comprising:
   a processor and a memory;
   a secure base activation image stored in the memory, the base activation image configured to implement an auto-connection service at the computer system, wherein the auto-connection service is configured to cause the processor to perform the following:
   performing a local activation by performing the following upon determining at a private port is open:
      using the private port, initiating an identification and attestation process with an activation service; and
   wherein a remote activation is performed upon determining that the private port is closed by performing the following:
      defaulting activation to a public port; and
      using the public port, initiating an identification and attestation process with the activation service;
   the base activation image configured to implement one or more services for performing the following:
      executing an identification process, using a cryptographically created identifier included in the base activation image, with the activation service to confirm an identity of the computer system;
      confirming system integrity of the computer system with the activation service; and
      based on confirming the identity of the computer system and confirming system integrity of the computer system, unlocking the computer system for load installation.

16. The computer system of claim 15, wherein the base activation image is implemented to have support for a plurality of instruction set architectures.

17. The computer system of claim 15, wherein the base activation image comprises cryptographically signed certificates that are specific to the computer system.

18. The computer system of claim 15, wherein the cryptographically created identifier comprises a unique registration key created using SHA256 and at least one of a platform key, a device key, a device serial number, or a platform host name.

19. The computer system of claim 15, wherein the one or more services are configured to use a UEFI to deactivate unused ports.

20. The computer system of claim 15, wherein the one or more services are configured to cause the load installation by:
   providing capabilities for the computer system to the activation service; and
   receiving the load based on the provided capabilities.

* * * * *